Figure 1:
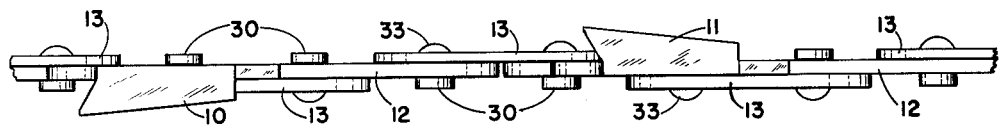

Feb. 13, 1962     E. H. HILL     3,020,942

DETACHABLE LINK SAW CHAIN

Filed Nov. 28, 1958

INVENTOR.
EMIL H. HILL
BY
*Lee R. Schermerhorn*
ATTORNEY

United States Patent Office 3,020,942
Patented Feb. 13, 1962

3,020,942
DETACHABLE LINK SAW CHAIN
Emil H. Hill, 6316 SE. 65th Ave., Portland, Oreg.
Filed Nov. 28, 1958, Ser. No. 777,014
3 Claims. (Cl. 143—135)

This invention relates to saw chains and has particular reference to an improved detachable connection for the links in a saw chain.

Saw chains are ordinarily made with the various types of links thereof permanently fastened together with rivets or the like. It is frequently necessary, however, to take the chain apart for one reason or another, such as to replace a damaged cutter link or to shorten or lengthen the chain. Sometimes it is desired to use the same saw chain on different saw bars which requires alteration in the length of the chain. Such replacements or adjustments are not easily made in the conventional saw chain. Another disadvantage of conventional saw chains is the high cost of fastening the links together in the customary manner, this operation constituting a significant factor in the market price of the chain.

Attempts have heretofore been made to provide detachable links in saw chains but the results have not been entirely satisfactory. Detachable links heretofore made have usually required extra parts, making the chain costly to manufacture. In some cases they have increased the thickness of the chain, thus impairing the cutting action of the saw and in other cases they have been awkward or difficult to manipulate in adding or removing links.

The objects of the present invention are, therefore, to provide an improved detachable link for saw chains which can be installed and removed without the use of tools, to provide a link arrangement in a saw chain which exhibits improved cutting action and which, at the same time, is economical to manufacture, to provide a saw chain having a minimum number of different parts and also a minimum total number of parts and to provide detachable links of a nature that makes it feasible to sell the purchaser of a new saw chain a supply of separate links which he may readily assemble himself, whereby the purchaser may obtain a complete saw chain at lower cost.

The present chain is so made that the purchaser of a new chain buys the component parts and assembles them himself, thereby saving the usual factory cost of assembly which is largely a hand operation in any event. If a single saw chain is to be used on saw bars of different length, the user may readily transfer the chain and adjust the length as may be necessary thereby further saving the cost of a second chain. When the cutting elements become damaged or worn out, it is a simple matter to replace one or many of the cutter links so that the full life of each cutter link may be utilized.

In order to achieve convenient detachability, the connector links are equipped with studs with eccentric heads which may be inserted or withdrawn from elongated holes in the cutter links and drive links only when the connecting links are turned to a position at right angles with respect to their normal positions in the chain. The detachable connection is thereby effected without the use of small or auxiliary parts which would be difficult to manipulate and easily lost.

The foregoing and other objects and advantages of the invention will become apparent and the invention will be better understood from the following description of the preferred embodiment illustrated on the accompanying drawing. It is to be understood, however, that various changes may be made in the construction and arrangement of parts, all such modifications within the scope of the appended claims being included in the invention.

Figure 2:
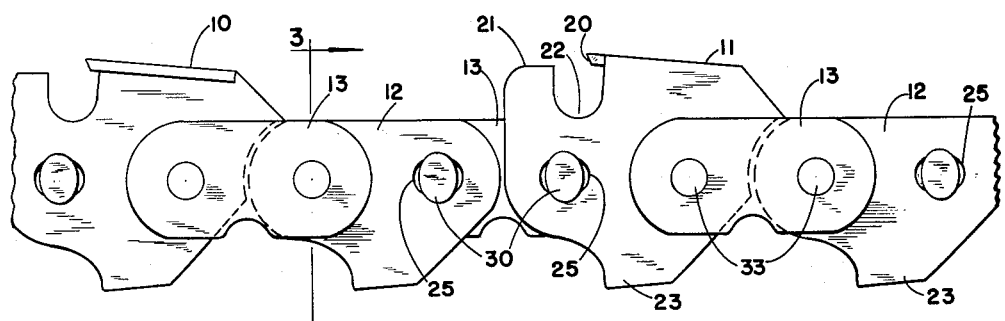
Figure 4:
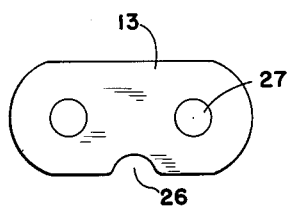
Figure 3:
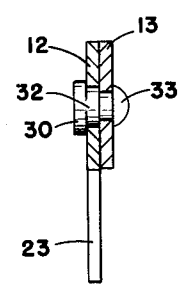

In the drawing:
FIGURE 1 is a top plan view of a saw chain embodying the novel features of the invention;
FIGURE 2 is a side elevation view of the saw chain;
FIGURE 3 is a cross sectional view taken on the line 3—3 of FIGURE 2;
FIGURE 4 is a side elevation view of a connector link without its studs; and
FIGURE 5 is an enlarged perspective view of a stud used in the connector links.

The saw chain as viewed from above, in FIGURE 1, comprises right-hand cutter links 10, left-hand cutter links 11, drive links 12 which are all identical and right and left connector links 13 which are identical. Thus, there are only four different parts to manufacture and assemble.

Each cutter link comprises a flat plate having an angular sharpened cutting edge 20, a depth gauge 21 of slightly less height than the elevation of the cutting edge and a recess 22 separating the depth gauge from the cutting edge. The lower side of each cutter link is formed with a spur or projection 23 to engage the drive sprocket and idler sprocket on the saw bar and to ride in the groove of the saw bar. Drive links 12 are plain flat plates which are also each equipped with a projection 23 to engage the sprockets and ride in the saw bar groove. Each cutter link and drive link is equipped with a hole 25 in each end thereof which is elongated in the direction of chain tension. The ends of holes 25 are rounded in a circular arc.

Figure 5:
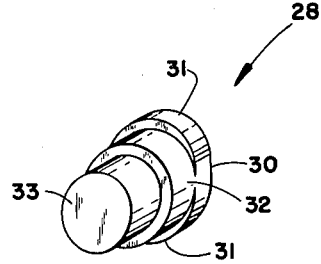

Each connector link 13 is a flat plate as shown in FIGURE 4 recessed at 26 on its under edge to clear the sprocket teeth and equipped in each end with a round hole 27 to receive the special stud 28 shown in FIGURE 5.

Each stud 28 is equipped with an oblong head 30 which is elongated transversely in one direction by the formation of two diametrically opposite lobes 31. The head 30 is of a transverse length and width to pass freely through the elongated holes 25 when the lobes 31 are aligned with the line of chain tension but, when the head is turned through 90 degrees, it will not pass through the holes 25 because the transverse dimension of the head through the lobes 31 exceeds the narrow vertical dimension of holes 25, as shown in FIGURES 2 and 3.

Adjacent the head 30 each pin has a cylindrical bearing surface 32 of the same diameter as the narrow transverse dimension of the head. Thus, each lobe 31 of the head forms a shoulder projecting transversely beyond the bearing surface 32. Further, each stud has a reduced cylindrical end 33 concentric with bearing surface 32 which is riveted into a hole 27 in the connector link 13. In riveting the end 33, the studs are turned so that lobes 31 project in a direction transverse to the line of tension. Thus, in FIGURE 2, all the heads 30 are seen to be elongated in a vertical direction while the holes 25 are elongated in a horizontal direction. Further, in the riveting operation, both studs are inserted from the same side of the connector link and the ends 33 are riveted tight against the opposite face of the connector link to prevent the studs from turning in the link. The chain is slack in FIGURE 2.

Since the ends of holes 25 in the cutter links and drive links are rounded to the same radius as bearing surface 32 on the studs, the links pivot readily with low friction in passing around the sprocket wheels. Such pivotal movement is not sufficient, however, to rotate the studs to disengaging position.

It will be observed in FIGURES 1 and 2 that the cutter links 10 and 11 and the drive links 12 are all aligned in a common vertical plane with the connector links 13 applied alternately on opposite sides. This arrangement employs only half the number of connector links used in most conventional saw chains where the connector links are paired and are not used singly. This improved arrangement of the connector links not only reduces the cost and weight of the chain but also reduces its thickness at any point to the combined thickness of one connector link and a cutter link or drive link, plus the thickness of head 30 and riveted end 33. Head 30 preferably has the same thickness as the links whereby the chain thickness is equal to the thickness of three link plates plus the riveted end 33. This reduced thickness reduces the drag in the saw kerf, permits a narrower kerf, facilitates faster cutting and prolongs the life of the saw chain and entire saw mechanism.

It will be apparent that a link or links may be removed or added at any point in the chain by merely loosening the chain until one of the links may be turned perpendicular to its adjacent links whereupon the oblong heads 30 may be withdrawn from the elongated hole 25. The riveting of studs 30 in connector links 13 is accomplished economically on automatic machines whereby the links may be sold unassembled at low cost to compete favorably with conventional saw chains that are completely assembled at the factory.

It is understood that the present saw chain is designed for use on a conventional type of chain saw having an elongated saw bar which is longitudinally grooved on its upper and lower edges to form a guide track for link projections 23. The ends of such a saw bar are equipped with driving end idler sprockets to drive the chain around the saw bar at high speed.

Having now described my invention and in what manner the same may be used, what I claim as new and desire to protect by Letters Patent is:

1. A detachable link saw chain comprising alternate cutter links and drive links disposed in a common plane, end holes of uniform width in said links elongated in a direction lengthwise of the chain, and a single connector link interconnecting each cutter link and drive link, each connector link having a pair of studs with cylindrical bearing surfaces adjacent to a face of the link engaging the ends of said elongated holes, and oblong heads on said studs transverse to the direction of the elongation of said holes overlying said cutter and drive links above and below said holes.

2. A detachable link saw chain comprising cutter links and drive links disposed in a common plane, end holes of uniform width in said links elongated in the direction of chain tension, a single connector link between each cutter link and drive link, successive connector links all being disposed on opposite sides of said cutter links and drive links, and end studs in said connector links having cylindrical bearing portions engaging the ends of said elongated holes and oblong heads, each head having a width in the direction of chain tension not exceeding the diameter of said bearing portion and having a width in a direction at right angles to the line of chain tension exceeding the diameter of said bearing portion, said heads being removable from said holes by turning one link at right angles to the links connected therewith.

3. A detachable link saw chain comprising cutter links and drive links disposed in a common plane, a connector link on one side of each cutter link connected with a drive link ahead and a connector link on the opposite side of each cutter link connected with a drive link behind, said cutter links and drive links having separate holes in their leading and trailing ends for connection with said connector links, said holes being elongated lengthwise of the links and being of uniform width with semicircular bearing surfaces in their ends, end studs in said connector links having cylindrical bearing portions engaging the ends of said holes, and T-heads on said studs having a width lengthwise of the link equal to the diameter of said cylindrical bearing portion and having a width transversely of the link exceeding the width of said holes, said heads being removable through said holes.

References Cited in the file of this patent

UNITED STATES PATENTS

| | | |
|---|---|---|
| 240,819 | Ewart | May 3, 1881 |
| 929,087 | Hadley | July 27, 1909 |
| 976,664 | Laubenstein | Nov. 22, 1910 |
| 2,826,226 | Donley | Mar. 11, 1958 |
| 2,891,586 | Wright | June 23, 1959 |